United States Patent [19]
Brooke

[11] Patent Number: 5,351,097
[45] Date of Patent: Sep. 27, 1994

[54] TARGET IMAGE RENDERING WITH COLOR TRANSPARENCIES

[75] Inventor: Kenneth R. Brooke, Arlington, Tex.

[73] Assignee: Hughes Training, Inc., Arlington, Tex.

[21] Appl. No.: 47,126

[22] Filed: Apr. 8, 1993

[51] Int. Cl.[5] .................... H04N 9/31; H04N 7/18
[52] U.S. Cl. .................... 348/744; 348/121
[58] Field of Search .................... 358/60, 62, 63, 64, 358/65, 66, 56, 104, 231, 230, 237, 242, 21 R, 93, 87, 88, 12, 15, 22, 183; 434/20, 23, 28, 38, 43, 308, 309, 310, 314; H04N 9/31, 7/18

[56] References Cited

U.S. PATENT DOCUMENTS

| | | | |
|---|---|---|---|
| 2,810,779 | 10/1957 | Tuck | 358/15 |
| 3,560,644 | 2/1971 | Petrocelli | 368/104 |
| 3,699,244 | 10/1972 | Cohen et al. | 358/104 |
| 4,621,281 | 11/1986 | Colineau | 358/64 |
| 4,974,073 | 11/1990 | Lnova | 358/104 |

Primary Examiner—James J. Groody
Assistant Examiner—Michael H. Lee
Attorney, Agent, or Firm—W. K. Denson-Low

[57] ABSTRACT

An image generation system (50) for generating three independent monochromatic images, using three monochromatic CRT projectors (56, 58, 60). An image generator (52) produces synchronized video signals representing the images, which drive the projectors. The image generator (52) is similar to a conventional image generator for a full color, single channel system, except that the red, green and blue color components are used to define separate monochromatic images which can overlap and still be fully rendered.

8 Claims, 2 Drawing Sheets

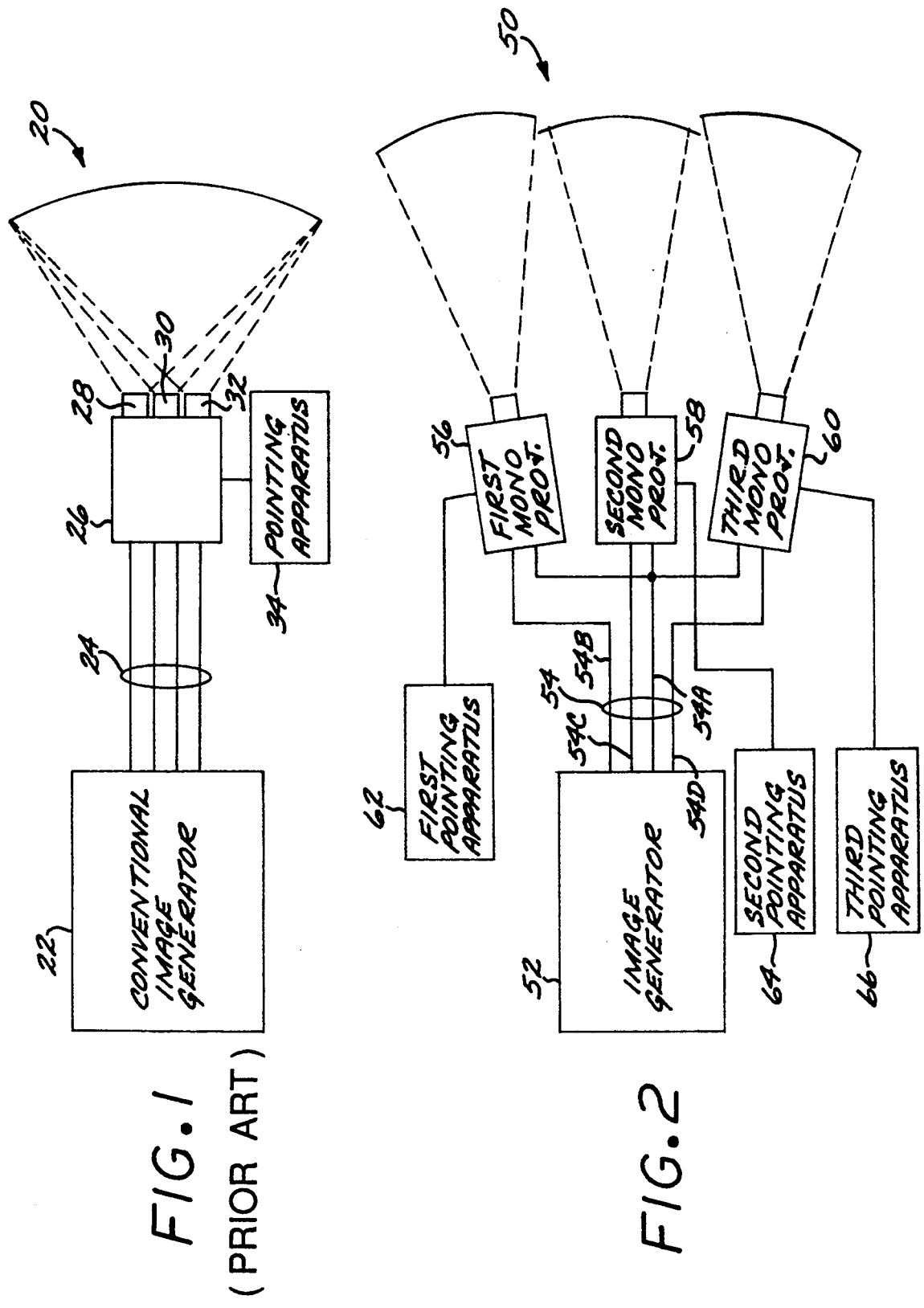

TARGET IMAGE RENDERING WITH COLOR TRANSPARENCIES

BACKGROUND OF THE INVENTION

The present invention relates to a method for producing a plurality of apparently independent target projection display channels from a single image generation channel and one projector.

The imagery produced by the visual display system of a flight training simulator is that imagery visible through the simulated aircraft cockpit windows, commonly consisting of real-time, computer-generated graphics projected onto a large dome-shaped screen. The background imagery portion includes those low interest peripheral and long-distance portions of the visible scene. Target imagery includes small, high interest portions of the scene, such as hostile aircraft, missiles, air and ground targets, and the like. In a typical conventional simulator system, target imagery is usually projected as an overlay onto the background imagery via slewable target projectors, one per target.

Monochrome target imagery is usually chosen for flight simulator visual systems due to the high cost of producing dynamic, full color imagery. These cost difficulties arise from the need to maintain focus and convergence in a color image that will be rapidly slewed over a large display dome projection screen. This can be achieved, but at the expense of utilizing complicated dichroic combiners, dynamic focussing, and/or intricate pointing mechanisms. The end result has been, over the years, that monochromatic target imagery is accepted by the user community primarily because it is cost-effective.

Unfortunately, the computer image generation technology has concentrated on full color systems. This leaves the system designer with the situation of being forced to satisfy a monochrome image requirement with a color system. This wastes much of the capability of the image generator, as it must work solely in grey shades or with a single primary color. The present invention allows an even more cost-effective alternative to be considered.

A conventional, full-color CRT video projector 20 is shown in block diagram form in FIG. 1, and already contains three separate video channels, one for each of the three primary colors, red, green, and blue. The system 20 comprises a conventional image generator 22, which outputs red, green, blue and synchronization (RGBS) signals 24 to an RGB color projector 26. The projector 26 includes a red CRT 28, a blue CRT 30, and a green CRT 32. The respective images from the CRTs 28, 30 and 32 combine to form a full color image in the conventional system. A pointing apparatus 34 is typically employed in a target projection system to provide positional control of the image.

The image content of the three primary color channels in the conventional system has always been assumed to be coherent. However, nothing in the technology imposes this restriction, and whatever is present on the RGB video signal inputs appears on the red-green-blue (RGB) projected display outputs of the system 20 of FIG. 1.

SUMMARY OF THE INVENTION

A single channel, slightly modified full color computer image generation system may be used to generate three separate monochrome images, routed to a single, slightly modified, color video projector to achieve three independent monochromatic target images. The only native required capability demanded of the image generator is that it be able to render transparent graphical objects, which are slightly modified in accordance with the invention. The only required modification to the video target projector that the standard three (red, green, blue) CRT projection tubes be replaced with three identical monochrome tubes. It will usually be convenient to also remount the monochrome tubes in a different orientation to enable them be aimed and focused independently.

Three apparent independent target projection display channels are gained from one image generation channel and one projector. The highest cost components, (the image generation channel and video projector) are thus amortized over three displays. The processing load management capabilities of the image generator are then able to be applied synergistically across three separate displays.

BRIEF DESCRIPTION OF THE DRAWING

These and other features and advantages of the present invention will become more apparent from the following detailed description of an exemplary embodiment thereof, as illustrated in the accompanying drawings, in which:

FIG. 1 illustrates a conventional full-color CRT video projector.

FIG. 2 illustrates a CRT video projector system in accordance with the invention employing three monochrome projectors.

DETAILED DESCRIPTION OF THE PREFERRED EMBODIMENT

Figure 3:
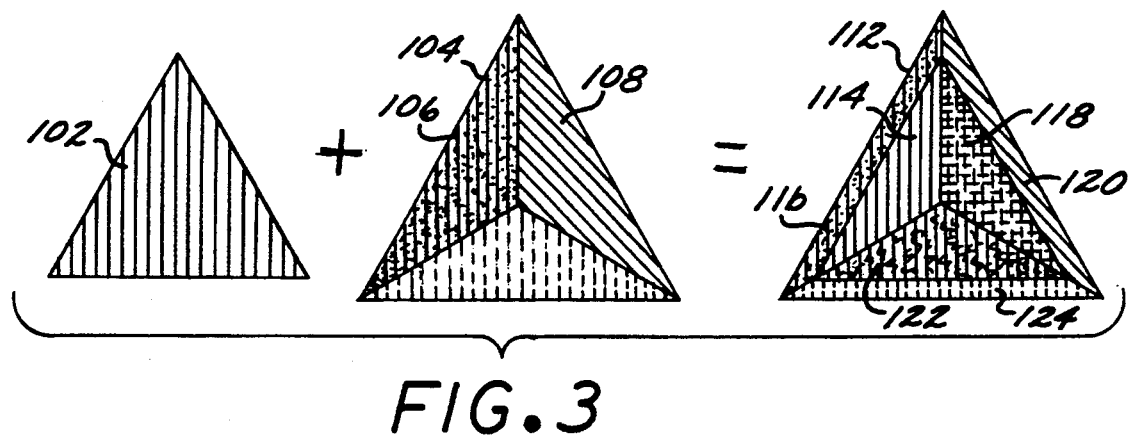
FIGS. 3-5 illustrate the color mixing technique implemented in the video projector system of FIG. 2.

The invention employs a new method of using a conventional full-color CRT video projector. The only electronic stipulation required for an implementation of a method in accordance with this invention using a conventional single channel, full-color projector system is that the three signals of the conventional system must be synchronized to a common synchronization signal or "genlocked." Such synchronization is a standard EIA signal format.

In accordance with the invention, the red, green and blue (RGB) cathode ray tubes (CRTs) of the conventional system are replaced with compatible monochrome CRTs, and their cabling harnesses are extended to allow their remounting in a more useable orientation. Independent pointing mechanisms can be provided so that the image from each CRT can be independently mechanically positioned. The former coherent RGB input is replaced by three independent images. No other hardware modifications are required. If the independent images were viewed with the conventional RGB projector of FIG. 1, one would see, e.g., a red, a green and a blue image all superimposed.

FIG. 2 illustrates an image generation system 50 in accordance with the present invention. An image generator 52 comprises transparency generation means in accordance with the invention, but is otherwise identical to the conventional image processor. The transparency generation means can be implemented as an algorithm performed in ROM, application specific integrated circuitry or other hard-wired logic. The outputs 54A-D of the image generator 52 have an identical RS-343 format as the RGBS video outputs of the conventional image generator 22 of FIG. 1. However, signal 54A is a synchronization signal, and signals 54B-D are respective genlocked monochrome video image generating signals, rather that the RGB components of one color image.

The output signals 54A-D are fed to respective monochrome projectors 56, 58 and 60. Each projector receives a respective one of the monochrome video signals, and the synchronizing signal 54A. In this embodiment, each projector has associated with it a respective pointing apparatus, with which to point the image generated by the projector to a desired static or dynamically changing location. As in the conventional image generator of FIG. 1, the system controller provides the control signals which control the operation of the image generator and the pointing apparatuses.

A new method of image generation is imposed by the invention, wherein the three normal color primary images are considered independent entities, rather than closely linked components of image color. In a preferred embodiment for a target generator, each color primary, red, green, and blue, is assigned to a single polygonal graphic target, yielding (from the viewpoint of the image generator) separate red, green and blue target (aircraft) graphic objects. Of course, the projected images may all actually be of the same color. Each target image is made to be transparent so that each may be seen through the others. Color other than that of the target image is made to mix an additive manner so that superimposed monochromatic target images simply yield composite colors over the overlapped portions in the image generator. The image generator is designed, in the conventional sense, to work in a full color projector environment. However, with this invention the image generator is "tricked" into working in three superimposed monochromatic and independent environments. Thus, even though the image generator operates as though it is mixing colors to create a composite color image, the red, green and blue images are really kept separate by the operation of the three independent monochrome generators. The integrity of the three images is preserved so that three separate images may be employed.

The transparency of the target model color is separately controlled to enable the use of this feature for canopies, windshields, and the like. The additive color mixing in accordance with this invention applies only to transparency and mixing between different colors, only from the perspective of the image generator, and would only be visible if the composite image were viewed on a conventional color projector or monitor. This could be an aid to the modeler who could utilize a low cost single RGB color monitor to check out his work.

Normally, an image generator would be responsible for both positional and attitudinal transformations to a target image as the aircraft, for example, traverses and maneuvers through the visual database. In the case of target projection in accordance with this invention, however, the respective pointing apparatus 62, 64 and 66 of the target projectors convert the x, y, z coordinates into azimuth and elevation angles. This provides the positional control of the image. The only task remaining for the image generator is the attitudinal adjustment of the target image as it goes through the various maneuvers required by the training scenarios. This allows the image generator to position the image at the center of the field of view and simply rotate the graphic target image as required about the three axes as dictated by, and synchronized to, the same scenario. The end result is a composite view at a image generator system control monitor displaying the composite color image of three target aircraft, for example, all seemingly anchored to the center of the screen and rotating through each other.

The normal function of transparency, as commonly implemented in conventional image generators, functions in a manner similar to the following algorithm:

$$(R_b - R_f)*T + R_f = R_v \quad (1)$$

$$(G_b - G_f)*T + G_f = G_v \quad (2)$$

$$(B_b - B_f)*T + B_f = B_v \quad (3)$$

where $R_b$, $R_f$, $R_v$ designate background, foreground, and viewed reds, respectively; $G_b$, $G_f$, $G_v$ designate background, foreground, and viewed greens, respectively; $B_b$, $B_f$, $B_v$ designate background, foreground, and viewed blues, respectively; and T designates transparency, i.e., 1=transparent and 0= opaque.

This conventional process may be described as operating like a neutral density filter placed over the colored filter comprising the foreground transparent target polygon. Transparency affects all color primaries in the same manner.

The present invention, however, requires that all background (non-target) colors be passed through unchanged. This is a central purpose of the invention. Otherwise, portions of the monochrome target models would be altered, an undesirable result. Moreover, the target color must act in accordance with its proper degree of transparency with respect to the same color in the background or in interactions between polygons in the target image model. The revised transparency polygonal attribute applies to each color primary for each polygon, and functions in a manner similar to the following algorithm:

$T_r$, $T_g$, $T_b$ designate red, green, and blue transparency with 1=transparent and 0=opaque For the red target image:

$$B_f = G_f = 0 \text{ for all components} \quad (4)$$

$$T_b = T_g = 1 \text{ for all components} \quad (5)$$

$$B_b = B_v; G_b = G_v; (R_b - R_f)*T_r + r_f = R_v \quad (6)$$

For the green target image:

$$R_f = B_f = 0 \text{ for all components} \quad (7)$$

$$T_r = T_b = 1 \text{ for all components} \quad (8)$$

$$R_b = R_v; B_b = B_v; (G_b - G_f)*T_g + G_f = G_v \quad (9)$$

For the blue target image:

$$R_f = G_f = 0 \text{ for all components} \quad (10)$$

$$T_r = T_g = 1 \text{ for all components} \quad (11)$$

$$R_b = R_v; G_b'G_v; (B_b - B_f)*T_b B_f = B_v \quad (12)$$

Figure 4:
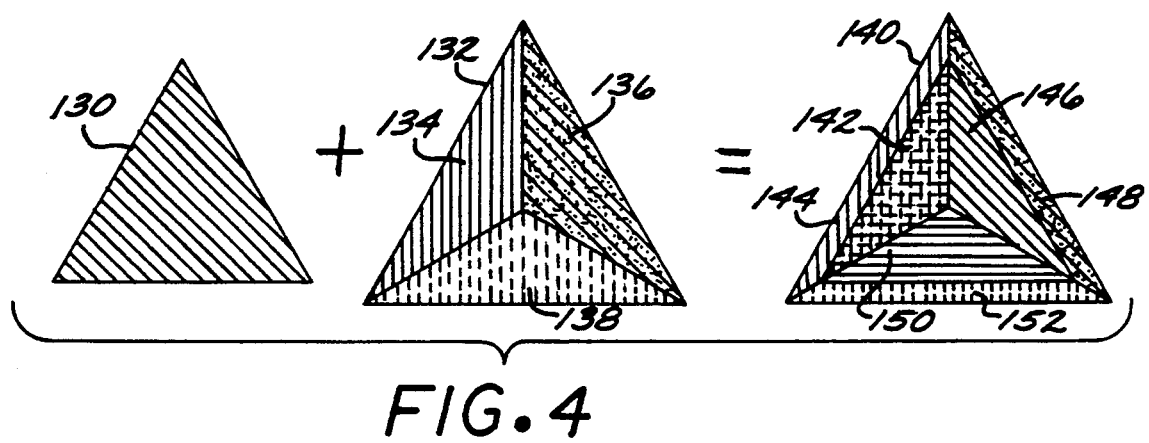
Figure 5:
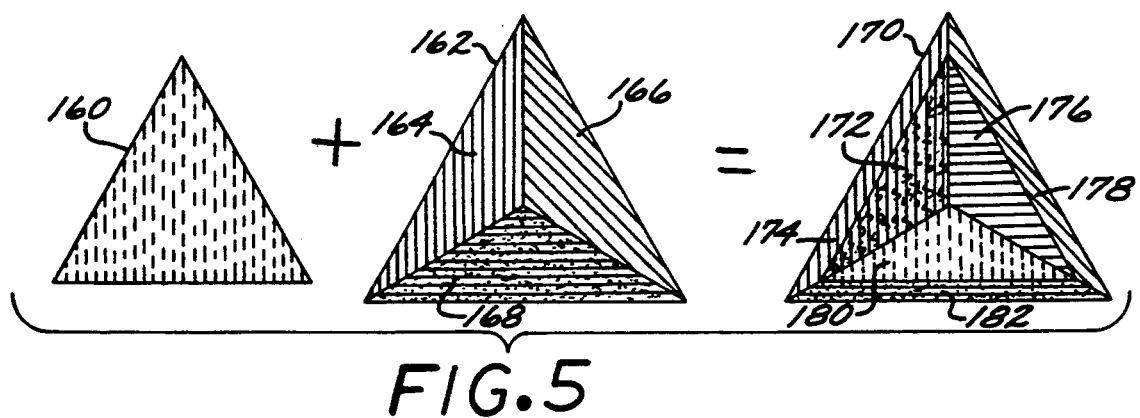

FIGS. 3-5 illustrate the type of color mixing employed in the image generator 52 of FIG. 2, implemented in accordance with eq. 4-12. In FIGS. 3-5, different types of cross-hatching are used, with each type of cross-hatching representing a particular color.

FIG. 3 represents the results of overlapping of a polygon 102 represented in the image generator as a red polygon, with a larger polygon 104 represented in the image generator as comprising three regions 106, 108 and 110, represented as a light red or pink, a green and a blue area, respectively. The overlapped image is polygon 112. The portion of region 106 of the polygon 104 overlapped by the red polygon 102 is now represented in the image generator as red region 114, with strip 116 representing the pink portion of region 106 not overlapped by polygon 102. The portion of region 108 of the polygon 104 overlapped by polygon 102 is now represented as yellow region 118, with strip 120 representing the green portion of region 108 not overlapped by polygon 102. The portion of blue region 110 of polygon 104 overlapped by the red polygon 102 is now represented as cyan region 122, with blue strip 122 representing the portion of the region 110 not overlapped by the red polygon 102.

FIG. 4 represents the results of overlapping of green polygon 130 with a larger polygon 132 comprising a red region 134, a light green region 136 and a blue region 138. The composite overlapped image is polygon 140. The portion of region 134 of the polygon 132 overlapped by polygon 130 is now represented as yellow region 142, with red strip 144 representing the non-overlapped portion of region 134. The portion of region 136 of the polygon 132 overlapped by polygon 130 is now represented as green region 146, with light green strip 148 representing the non-overlapped portion of region 136. The portion of region 138 overlapped by polygon 130 is now represented as medium blue region 150, with blue strip 152 representing the non-overlapped portion of region 138.

FIG. 5 represents the results of overlapping of blue polygon 160 with a larger polygon 162 comprising a red region 164, a green region 166 and a light blue region 168. The composite overlapped image is polygon 170. The portion of region 164 overlapped by polygon 160 is now represented as cyan region 172, with red strip 174 representing the non-overlapped portion of region 164. The portion of region 166 overlapped by polygon 160 is represented by medium blue region 176, with green strip 178 representing the non-overlapped portion of region 166. The portion of region 168 overlapped by polygon 160 is shown as blue region 180, with light blue strip 182 representing the non-overlapped portion of region 168.

In each case shown in FIGS. 3-5, a foreground color superimposed on a lighter shade of the same color remains the same foreground color. Superposition of a foreground color on a different background color results in additive mixing of the two colors.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An image projecting system for projecting three independent monochromatic images using a single color image generation channel, comprising:

a single full color image generation channel comprising a color image generator for generating red, green and blue video signals nominally representing the color components of a single full color image, and a synchronization signal;

first, second and third monochrome image projection means each responsive to a given one of said red, green or blue video signals and to said synchronization signal for projecting first, second and third independent monochrome foreground images corresponding to said respective red, green and blue video signals;

wherein said color image generator further comprises image transparency generation means for rendering transparent, only with respect to operations of said image generator, each image component represented by said red, green, and blue video signals so that each image component may be seen through the others, and wherein color other than that of the foreground image component is made to mix in an additive sense so that superimposed monochromatic images yield composite colors over the overlapped portions of the foreground image component.

2. The system of claim 1 wherein each of said first, second and third monochrome image projection means comprises a monochrome projection cathode ray tube (CRT) controlled by said respective red, green or blue video signal and said synchronization signal.

3. The system of claim 1 wherein said first, second and third image projection means further comprises first, second and third pointing apparatus to independently point said respective image projection means in independently determined directions.

4. The system of claim 1 wherein said image transparency generation means comprises means for passing through without change all background colors which are not overlapped by other images.

5. The system of claim 4 wherein each color component within said image generator comprises a target image, and said image transparency means comprises means for implementing the following transparency algorithm:

for a red video signal representing a foreground target image:

$$B_f = G_f = 0 \text{ for all components;} \quad (4)$$

$$T_b = T_g = 1 \text{ for all components;} \quad (5)$$

$$B_b = B_v;\ G_b = g_v;\ (R_b - R_f)^*T_r + R_f = R_v; \quad (6)$$

for a green video signal representing a foreground target image:

$$R_f = B_f = 0 \text{ for all components;} \quad (7)$$

$$T_r = T_b = 1 \text{ for all components;} \quad (8)$$

$$R_b = R_v;\ B_b = B_v;\ (G_b - G_f)^*T_g + G_f = G_v; \quad (9)$$

for a blue video signal representing a foreground target image:

$$R_f = G_f = 0 \text{ for all components;} \quad (10)$$

$$T_r = T_g = 1 \text{ for all components; and} \quad (11)$$

$$R_b = R_v;\ G_b = G_v;\ (B_b - B_f)^*T_b + B_f = B_v; \quad (12)$$

where $T_r$, $T_g$, $T_b$ designate red, green and blue transparency with 1=transparent and 0=opaque; $R_b$, $R_f$, $R_v$ designate background, foreground and viewed red components respectively; $G_b$, $G_f$, $G_v$ designate background, foreground and viewed green components, respectively; and $B_b$, $B_f$, $B_v$ designate background, foreground and viewed blue components, respectively.

6. A method for projecting three independent monochromatic target images using a single color image generation channel comprising a color image generator for generating first, second and third video signals nominally representing the respective red, green and blue components of a single full color target image, and a synchronization signal, comprising a sequence of the following steps:

providing first, second and third monochrome image projection means for projecting first, second and third monochrome target images;

generating said first, second and third video signals to represent independent first, second and third independent target images;

driving said first, second and third monochrome image projection means with said respective firsts, second and third video signals and said synchronization signals to project said first, second and third monochrome target images corresponding to said respective first, second and third video signals; and independently controlling the pointing of said first, second and third image projection means so that the respective projected positions of said respective target images are independent of the positions of the other of said projected target images.

7. The method of claim 6 wherein said step of generating said first, second and third video signals comprises the step of passing through without change all background image colors which are not overlapped by other images.

8. The method of claim 7 wherein each color component representation within said image generator comprises a target image, and said step of generating said first, second and third video signals comprises implementing the following transparency algorithm:

for a red video signal representing a foreground target image:

$$B_f = G_f = 0 \text{ for all components;} \quad (4)$$

$$T_b = T_g = 1 \text{ for all components;} \quad (5)$$

$$B_b = B_v;\ G_b = G_v;\ (R_b - R_f)^* T_r + R_f = R_v; \quad (6)$$

for a green video signal representing a foreground target image:

$$R_f = B_f = 0 \text{ for all components;} \quad (7)$$

$$T_r = T_b = 1 \text{ for all components;} \quad (8)$$

$$R_b = R_v;\ B_b = B_v;\ (G_b - G_f)^* T_g + G_f = G_v; \quad (9)$$

for a blue video signal representing a foreground target image:

$$R_f = G_f = 0 \text{ for all components;} \quad (10)$$

$$T_r = T_g = 1 \text{ for all components; and} \quad (11)$$

$$R_b = R_v;\ G_b = G_v;\ (B_b - B_f)^* T_b + B_f = B_v; \quad (12)$$

where $T_r$, $T_g$, $T_b$ designate red, green and blue transparency with 1=transparent and 0=opaque; $R_b$, $R_f$, $R_v$ designate background, foreground and viewed red components respectively; $G_b$, $G_f$, $G_v$ designate background, foreground and viewed green components, respectively; and $B_b$, $B_f$, $B_v$ designate background, foreground and viewed blue components, respectively.

* * * * *